Sept. 17, 1935.   A. PIETZSCH   2,015,040
PREPARATION OF HYDROGEN PEROXIDE
Filed May 27, 1935   2 Sheets-Sheet 1
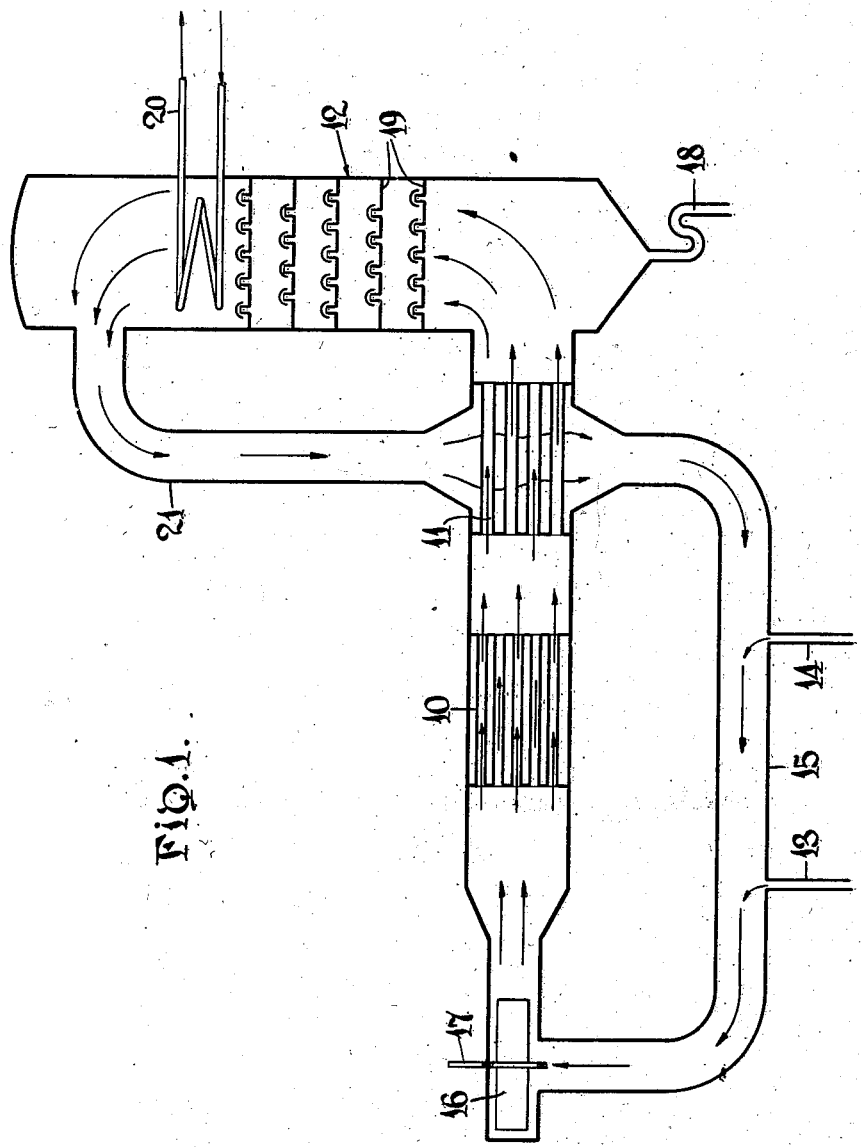
INVENTOR
Albert Pietzsch,
BY
Bean, Brooks, Buckley & Bean
ATTORNEYS Sept. 17, 1935.  A. PIETZSCH  2,015,040
PREPARATION OF HYDROGEN PEROXIDE
Filed May 27, 1935  2 Sheets-Sheet 2
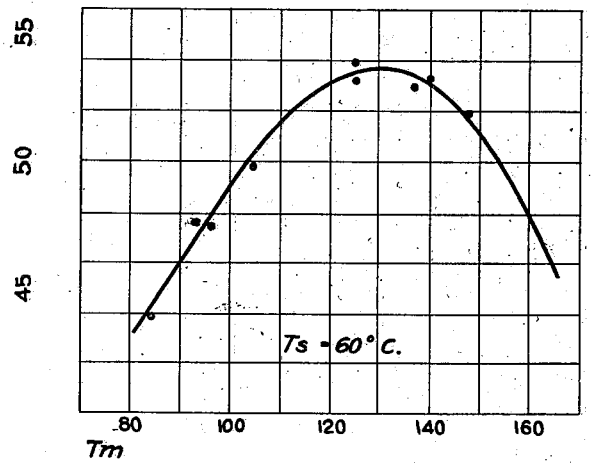
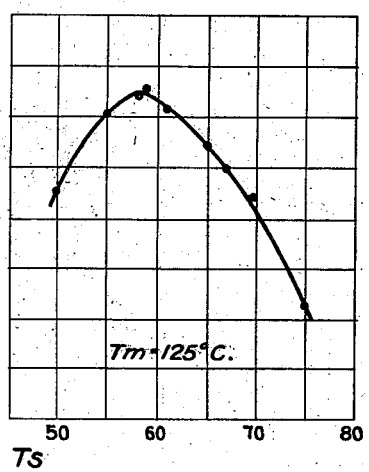
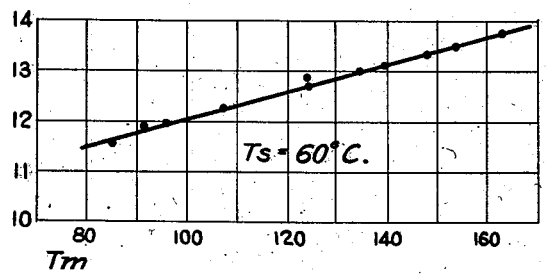
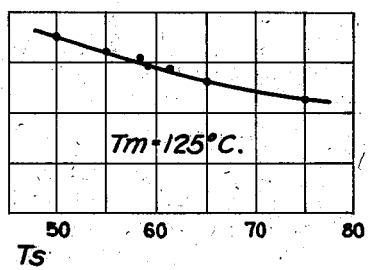
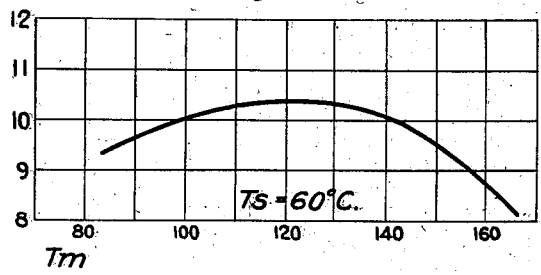
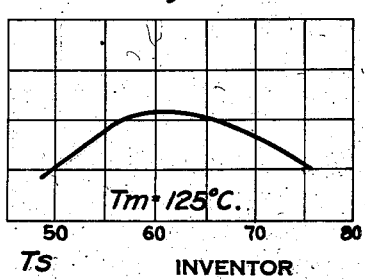
INVENTOR
Albert Pietzsch,
BY
Beau, Brooks, Buckley & Beau.
ATTORNEYS Patented Sept. 17, 1935

2,015,040

UNITED STATES PATENT OFFICE.

2,015,040

PREPARATION OF HYDROGEN PEROXIDE

Albert Pietzsch, Solln, near Munich, Germany, assignor to Elektrochemische Werke Munchen A. G., Hollriegelskreuth, near Munich, Germany Application May 27, 1935, Serial No. 23,757
In Germany May 31, 1933

5 Claims. (Cl. 204—31)

This invention relates to the production of hydrogen peroxide from its elements under conditions of high moisture content and at relatively high temperatures.

It is well known that hydrogen peroxide is formed by electrical discharge in hydrogen-oxygen mixtures. In general, heretofore, the operation has been performed upon dry reaction gases and at low temperatures. It has already been proposed in a British patent to produce the reaction gases hydrogen and oxygen electrolytically, in this case collect the gases over water, then force the gases to enter the electrical discharge chamber. The presence of the humidity picked up in the electrical formation of the gases is only incidental, however, and therefore, only small traces of water vapor were present per cubic meter so that the favorable influence due to the presence of substantial quantities of moisture was not apparent in the prior process. The applicant has investigated whether an addition of water vapor to the reaction gases and at the same time using elevated temperatures would improve the yield of hydrogen peroxide. The applicant has discovered that quantities of water vapor of at least 50 grams per cubic meter have a yield increasing influence upon the hydrogen peroxide; the yield increasing influence does not depend alone upon the moisture content but also upon other conditions, for instance, the gas temperature for an addition of water vapor alone may improve or decrease the yield. By choosing the wrong relationship of the other conditions the water vapor may have no influence or might even cause a decrease in operating efficiency.

In the drawings:

Fig. 1 is a diagrammatic view of an apparatus suitable for use in conjunction with the operation of the present invention;

Fig. 2 shows a plot of the hydrogen peroxide yield per hour at increasing gas temperatures at a constant saturation temperature;

Fig. 3 shows a plot of the hydrogen peroxide yield per hour at increasing saturation temperatures at a constant gas temperature;

Fig. 4 shows the change of electrical power consumed with increasing gas temperatures;

Fig. 5 shows the change of the power consumed with increasing saturation temperatures;

Fig. 6 is a plot showing the variation of the energy-yield with change in gas temperature at a constant saturation temperature; and Fig. 7 shows the plot of the change in energy yield with change in saturation temperature, the gas temperature being constant.

When a given quantity of dry reaction gases were used in a conventional apparatus 0.098 gram of hydrogen peroxide was formed per hour, while with 20% moisture (humidity), 0.217 gram of hydrogen peroxide per hour was formed. The electrical consumption is, because of the moisture, even somewhat lowered, so that the influence on the energy yield (the quotient of the hydrogen peroxide production divided by the energy added) is even larger than these figures show. Further examples are given in the accompanying Fig. 3, which at constant average gas temperature $tm$ in the discharge chamber, shows the influence of the amount of moisture (characterized by the saturation temperature $ts$) on the hydrogen peroxide production, the electrical power consumed (Fig. 5) and the energy-yield (Fig. 7). One notices that a specified amount of water vapor per cubic meter must be employed, otherwise a decrease in yield might ensue due to the water vapor. Furthermore, a specified value for the moisture in relation to the average gas temperature $tm$ in the reaction chamber must be chosen for good production. Because of the presence of the moisture in the product produced in accordance with the present invention, $tm$ may not be much smaller than $ts$, because otherwise condensation on the insulation parts of the electrical apparatus and short circuits or at least heavy losses of electrical current might occur. To prevent such occurrences it is sufficient to make $tm$ somewhat larger than $ts$.

The examples set forth in Figs. 2, 4 and 6 show that for optimum relation and therefore optimum yield of hydrogen peroxide the average gas temperature $tm$ must be made considerably larger than $ts$. This optimum relation is based upon a new and important physical law. It has been proposed, heretofore, to operate in the discharge chamber at temperatures at which condensation of the reaction product upon the walls of the reaction chamber is not permitted; a desirability when the hydrogen peroxide and water vapor are concentrated to a considerable extent. To this end relatively low temperatures are serviceable because the condition giving high energy-yields does not permit high concentrations of hydrogen peroxide vapor to occur in the discharge chamber. When the hydrogen peroxide vapors in the discharge chamber are highly concentrated, a partial destruction of such hydrogen peroxide is induced by the electrical current. From the viewpoint of preventing condensation of the reaction product no optimum temperature has been found heretofore, but to accomplish this end, it is sufficient to surpass the saturation temperature. In accordance with the procedures of the present invention and in accordance with another viewpoint, the average temperature in the apparatus is chosen to produce the optimum relation between $tm$ and $ts$. The optimum for temperature of the gas mixture lies, in such case, considerably above the saturation temperature of the gas-vapor mixture, so that this is strongly overheated. In accord with the investigations leading to the present invention, the gas temperature $tm$ must have a particular value for any moisture content, if the yield is to be the optimum. According to these investigations the optimum temperature for $ts$ is in general greater than 40° C. and $tm$ greater than 50° C. The exact position of the optimum may be found by tests and depends particularly upon the fact whether greater operating weight is placed upon increased energy-yield or upon increased hydrogen peroxide production in a particular apparatus.

By adjusting these optimal relations of $ts$ and $tm$, further advantages arise in developing the practical hydrogen peroxide production method by electrical discharge, since, as already mentioned, a considerable concentration of hydrogen peroxide vapor in the reaction chamber is not desirable, and as one, on the other hand, desires the highest percentage hydrogen peroxide solution as is possible to obtain as the basis for a practical operation, then we must, by cooling the reaction gases for instance, produce a lower percentage condensate, subsequently changing this to a higher percentage solution in a distillation or rectifying apparatus which would require an additional energy input in the form of heat. The gases are, however, as shown in the accompanying curves, highly overheated under the optimal conditions, that is, they can dispose of considerable quantities of heat before they condense. This quantity of heat may be utilized, in accordance with the invention, for operating a distilling column, so that without addition of energy, high percentage hydrogen peroxide solution is obtained.

In accordance with the accompanying Fig. 1 the reaction gases, after leaving the electrical reaction zone, built in conventional fashion, pass to a superheater, which, as further described hereinafter, represents a further factor of the invention, and then enter the column from the bottom. This column is constructed in a manner well known in this art and is supplied, for instance, either with single floors or with a filling of Rashig rings or other filling bodies. The gases are cooled down in the upper part of the column, for instance by means of a pipe system with cooling water flowing therethrough. By proper dimensioning of the column and under proper cooling, a continuous flow of high percentage (for instance 30%) hydrogen peroxide is obtained from the bottom of the column, while the percentage of the hydrogen peroxide vapors in the reaction gases flowing toward the column is very small (0.5%). By properly dimensioning the column and the condenser, a point is reached where the vapor-gas mixture discharges from the top of the column without a trace of hydrogen peroxide. Therefore one will, in general, cool down the gases in the condenser to such an extent that they have the most advantageous moisture content for the reaction, therefore to the saturation temperature $ts$. One can, in particular cases, cool the gases down still further and subsequently add the deficiency of moisture by spraying water thereto or by addition of water vapor. This is recommended especially when, for instance for reasons of space deficiency, the column cannot be made to the desired height, and therefore, in a smaller space a strong column effect is bound to appear—which, in accordance with known rules, takes place the sooner the greater the temperature difference is between the entering and outgoing gas. It is usually advantageous to re-circulate the gas mixture which leaves the column back again to the electrical reaction zone, for instance with the aid of a fan, after the gases consumed by the reaction have been replaced by addition of hydrogen and oxygen.

Without special treatment, in accordance with this procedure, the reacting gases would enter the reaction chamber with a temperature of $ts$ or lower due to heat loss to the surrounding air, since, however, as basis for the energy-yield, as above mentioned, a specified high temperature is desirable, one can either heat the gases externally before their entrance into the reaction zone, or follow the procedure as in the example shown in Fig. 1. According to the drawings the gases pass to a superheater, for instance, a pipe system, through which the strongly overheated gases flow leaving the reaction zone and over which upon the outside the cold gases ($ts$ warm) flow. In this manner the two gases partly interchange their heat. By correct adjustment of the superheater one can reach a point where the warm gases $ts$ can be heated to that temperature most advantageous for the energy-yield.

By this circulating process the end is achieved that the chemical heat of formation liberated during the electrical ionization followed by molecular union, or through direct heating of the gases and also by the direct union of hydrogen and oxygen, is completely utilized, so that a further addition of heat is not necessary. Substantially the entire electrical energy plus the chemical heat of formation will be taken off by means of the cooling water provided the heat circulation is good. The hot water obtained in this manner can be utilized for different purposes.

In the drawings a reaction chamber is shown diagrammatically at 10, a heat interchanger at 11 and a cooling column at 12. Hydrogen and oxygen gases enter the apparatus at the induction ports 13 and 14, respectively, and mingle with previously treated gases in the return conduit 15, the quantities of the hydrogen and oxygen added being regulated by the composition of the return gases, the mixture passing to the circulating device or fan 16 which delivers the gases to the reaction chamber 10. Prior to the entrance of the reaction gases to the reaction chamber the quantity of moisture calculated to produce the desired and optimum degree of saturation is added to the reaction mixture, as for instance by means of a water spray or steam jet 17.

After passing through the reaction chamber and being subjected to the proper electrical discharge for producing ionization of the gases and their molecular union to hydrogen peroxide, the mixture passes through the heat interchanger 11 where some sensible heat is transferred to the return gases previously treated in the reaction chamber. From the heat interchanger 11 the partially cooled gas mixture, containing hydrogen peroxide, water, hydrogen and oxygen, debouches into the cooling column 12 where the hydrogen peroxide is condensed from the mixture, together with some of the water, the condensate discharging through the seal 18, the gases passing up through the plate 19, or other device, and over the cooling coils 20. The non-condensable gases pass from the top of the column and pass into the down taker 21 and over the heat interchanger 11, and thence complete the cycle of operation.

From the foregoing it will be apparent that the present invention provides an apparatus for and method of producing hydrogen peroxide synthetically from its elements under related conditions of temperature and moisture content whereby the energy-yields are materially increased and greater operating efficiencies obtained:

What is claimed is:

1. The process of producing hydrogen peroxide by electrical discharge in hydrogen-oxygen mixtures which comprises adding water vapor to the reaction gases in amount to produce a saturation temperature of greater than 40° C., maintaining the temperature of the reacting gases above the saturation temperature of the gases, and subjecting the gases to electrical discharge.

2. The process of producing hydrogen peroxide by electrical discharge in hydrogen-oxygen mixtures which comprises adding water vapor to the reaction gases in amount to produce a saturation temperature of greater than 40° C., maintaining the temperature of the reacting gases above 50° C., and subjecting the gases to electrical discharge.

3. The process of producing hydrogen peroxide by electrical discharge in hydrogen-oxygen mixtures which comprises adding water vapor to the reaction gases in amount to produce a saturation temperature of greater than 40° C., maintaining the temperature of the reacting gases above 50° C., subjecting the gases to electrical discharge and thereafter passing the gases containing hydrogen peroxide vapor through a heat exchanger to lower the temperature of the vapor.

4. The process of producing hydrogen peroxide from hydrogen-oxygen mixtures which comprises adding water vapor to the reaction gases in amount to produce a saturation temperature greater than 40° C., maintaining the temperature of the reacting gases above 50° C., subjecting the gases to electrical discharge with the production of hydrogen peroxide, condensing the hydrogen peroxide from the mixture and passing the peroxide free gases back to the reaction chamber after heat interchange with the gases leaving the reaction chamber.

5. The process of producing hydrogen peroxide by electrical discharge in hydrogen-oxygen mixtures which comprises adding at least 50 grams of water per cubic meter of gas mixture at a temperature where the water remains in the vapor state, and subjecting the gases to electrical discharge to produce hydrogen peroxide at a temperature above that at which water would condense from the gas mixture.

ALBERT PIETZSCH.